Patented Nov. 2, 1948

2,452,700

UNITED STATES PATENT OFFICE 2,452,700

COPOLYMERS OF 2,5-DIMETHYL-1,5-HEXADIENE AND ACRYLIC ESTERS

Pliny O. Tawney, Passaic, N. J., assignor to United States Rubber Company, New York, N. Y., a corporation of New Jersey No Drawing. Application June 29, 1946, Serial No. 680,515

6 Claims. (Cl. 260—84.5)

My invention is concerned with a new class of unsaturated polymeric materials of relatively low molecular weight which are soluble in a variety of organic liquids and are resistant to further polymerization, although readily convertible to insoluble, infusible products by copolymerization with reactive compounds containing an ethylenic linkage (>C=C<). More particularly, my invention relates to soluble, unsaturated copolymers of a non-conjugated diolefinic hydrocarbon with an ester of acrylic acid or of an alpha-alkylacrylic acid and a non-enic monohydric alcohol, hereinafter designated as an acrylic ester. My invention further relates to a method for preparing these soluble, convertible resins.

It is well-known that the copolymerization of an acrylic ester with a conjugated diene such as 1,3-butadiene, which is itself readily polymerizable, yields a soluble, unsaturated, rubber-like product of relatively high molecular weight which can be further polymerized or cured with comparative ease to a heat- and solvent-resistant material. However, in U. S. Patent No. 2,202,846, Garvey and Alexander have pointed out that, in contrast to such soluble, unsaturated copolymers which may contain as much as 50% by weight of the conjugated diene, the copolymerization of an acrylic ester with even small amounts of a non-conjugated compound such as a 1,4-diene (a type which itself possesses little tendency to homopolymerize), results in the formation of an insoluble, saturated gel. Similarly, Thomas and Sparks have shown in U. S. Patent No. 2,322,073 that the copolymerization of an olefine such as isobutylene with as little as 0.01% of dimethallyl (2,5-dimethyl-1,5-hexadiene), leads to the formation of an insoluble, rubbery material of low unsaturation and high molecular weight. Such products are of limited utility in many applications such as coating and molding operations where a soluble, fusible, unsaturated resin of low molecular weight is desired which is capable of being subsequently cured to the insoluble, infusible state by further polymerization.

I have now unexpectedly discovered that, contrary to Garvey et al., an acrylic ester can be readily copolymerized with a non-conjugated diene, specifically 2,5-dimethyl-1,5-hexadiene, to yield soluble, unsaturated resins which, unlike the analogous copolymers of conjugated dienes, are of relatively low molecular weight and display little or no rubber-like character. As Garvey et al. have observed, when the cross-linking reactant, in this case the diene, is present in small amounts, the copolymer becomes insoluble after a minor proportion of the acrylic ester has copolymerized therewith. Hence, it was surprising to find that as the molar ratio of the said cross-linking diene to the acrylic ester in the reaction mixture is increased above approximately 1:9, the amount of the acrylic ester which can be converted to the copolymeric form before gelation is also increased, and in the presence of a sufficient quantity of the diene, i. e., a molar ratio of 6:1, or more, essentially all of the acrylic ester can be converted to an unsaturated copolymer without insolubilization. The acrylic esters copolymerize with 2,5-dimethyl-1,5-hexadiene in a wide variety of proportions and it is therefore possible by my invention to secure copolymers which, unlike those of the prior art, contain considerable amounts of the non-conjugated diene. For example, I have found that I can readily prepare a copolymer of methyl acrylate and 2,5-dimethyl-1,5-hexadiene in which the diene constitutes nearly 45% by weight of the product.

My new copolymers range in character from easily comminuted solids to viscous or plastic masses depending upon the relative proportions of the reactants and upon the choice of an appropriate acrylic ester. In general, the softening points and molecular weights of my copolymers tend to decrease as the amount of the non-conjugated diene in the reactant mixture is increased, and an increase in the diene content of the copolymers is also accompanied by a corresponding increase in their hydrocarbon solubility. For any given molar ratio of the diene to acrylic ester, copolymers derived from esters of acrylic acids and lower alcohols, e. g., methanol and ethanol, will be harder and higher-melting, while the acrylic esters of higher alcohols such as n-butanol and n-octanol yield copolymers of the softer, more plastic type. Products of intermediate character can be secured by copolymerizing the diene with a mixture of acrylic esters or by alcohol interchange between the copolymer and an appropriate alcohol. Suitable acrylic esters for use in my invention are represented by the type formula $CH_2=C(R)-CO-OR'$ where R is selected from the class consisting of hydrogen and alkyl, e. g., methyl, ethyl, and R' may be alkyl, e. g., methyl, ethyl, propyl, isopropyl, butyl; aryl, e. g. phenyl; and aralkyl, e. g., benzyl. Exemplary of such esters are n-butyl acrylate, methyl methacrylate, methyl acrylate, ethyl methacrylate, methyl ethacrylate, and phenyl acrylate.

In further contrast to the copolymers of acrylic esters and conjugated dienes, my products possess only a slight tendency to cure to the insoluble, infusible state even when heated at elevated temperatures, e. g., 100° C., with peroxide catalysts, although they gradually become insoluble and even infusible upon prolonged heating, especially at temperatures above 250° C. Since the latter temperature is considerably above the processing temperatures commonly employed for plastic materials, my products behave, for many purposes, as soluble, thermoplastic resins and are useful as such. In view of the resistance of my unsaturated copolymers to further polymerization, it was surprising to find that they copolymerize so readily with reactive monomers containing an ethylenic linkage, e. g., diethyl fumarate, to yield insoluble, infusible products. Thus, my invention may be utilized for the production of either thermoplastic or thermosetting resins.

The preparation of my new copolymers is carried out by heating a mixture of the non-conjugated diene and an acrylic ester at a temperature in the range from about 25° C. up to the reflux temperature of the reaction mixture (in the neighborhood of 120° C.), and for overall economy it is preferable to operate in the higher part of the range, e. g., 100-120° C. Temperatures above the normal boiling point of the reaction mixture can, of course, be employed, but the necessary pressure equipment entails additional expense without offering any marked compensating advantages.

The copolymerization reaction is accelerated by per-oxy compound catalysts such as acetyl peroxide, benzoyl peroxide, acetyl benzoyl peroxide, succinyl peroxide, and tertiary-butyl hydrogen peroxide.

The course of the copolymerization can be followed by observing the increase in viscosity of the reaction mixture, and after the reaction has been halted by cooling, the copolymer can be isolated by distilling off any unreacted starting materials or by extracting them with a solvent in which the copolymer is insoluble. If desired, the copolymer can be further purified by dissolving it in a solvent such as acetone and precipitating it with a non-solvent such as a methanol-water mixture. Since my products are readily soluble in the monomeric 2,5-dimethyl-1,5-hexadiene, the copolymerizations can be conducted in an excess of the diene, if desired, for the resulting free-flowing solutions are easily handled in transfer, mixing, storage, and other mechanical operations to which the copolymers themselves may be less amenable. Since my copolymers are resistant to further polymerization, they can be easily recovered from such solutions by heating to distill off the excess diene.

When freed from solvents my copolymers can be cast or molded in a known manner to form rods, blocks, sheets, etc., and in this form they are particularly useful where clear flexible articles are required, such as for safety glass interlayers. Alternatively, the copolymers can be dissolved in appropriate solvents and used for coating and impregnating processes. In the preparation of such solutions, it is often unnecessary to isolate the copolymer from the reaction mixture, for higher-boiling solvents may be added directly to the crude copolymerization reaction mixture and unreacted starting materials can be removed by subsequent distillation of the solution. Suitable dyes, pigments, fillers, plasticizers and resins can be incorporated with my copolymers to modify their character for specific applications.

Where heat and solvent-resistant materials are desired, my products can be easily converted to the insoluble, infusible state by copolymerization with reactive compounds containing an ethylenic linkage, such as methyl acrylate, diethyl fumarate, diallyl fumarate, etc. My copolymers dissolve readily in a number of these reactive ethylenic compounds to form solutions which can be totally polymerized, leaving no solvent to be evaporated. Many of these solutions display low viscosities even at relatively high solids content, which property renders them particularly suitable for coating, impregnating and casting compositions which can be cured to the insoluble, infusible state with a minimum of blowing, shrinking, and distortion.

The following examples disclose my invention in more detail; all parts being by weight:

EXAMPLE 1

To illustrate my discovery that the copolymerization of 2,5-dimethyl-1,5-hexadiene with an acrylic ester leads to the formation of soluble, polymeric materials, mixtures of various proportions of methyl acrylate and the diene are heated with benzoyl peroxide at 60° C. to the point of incipient gelation. The polymerizations are then halted by cooling and the reaction mixtures are poured into n-hexane. The precipitated copolymers are further purified by solution in acetone and precipitation with n-hexane, and drying to constant weight in vacuo. The yields of product are then determined.

The data are summarized below in Table I which includes the weights of the copolymerizable monomers, of the peroxide catalyst, and of the products, as well as the reaction times. For purposes of comparison only, the polymerization of the diene in the absence of methyl acrylate is also included, to demonstrate that 2,5-dimethyl-1,5-hexadiene polymerizes with itself only to a negligible extent.

Table

| Example | Methyl Acrylate | 2,5-Dimethyl-1,5-hexadiene | Benzoyl Peroxide | Reaction Time, hours | Polymeric Product |
|---|---|---|---|---|---|
| a | 100 | 14.2 | 0.00 | 3.0 | 6.4 |
| b | 100 | 128.2 | 0.56 | 2.0 | 19.1 |
| c | 100 | 256.0 | 1.69 | 2.1 | 38.9 |
| d | 100 | 384.0 | 4.50 | 5.6 | 66.8 |
| e | 100 | 513.0 | 6.55 | 6.7 | 90.1 |
| f | 100 | 725.0 | 9.36 | 82.6 | 161.0 |
| g | | 100.0 | 2.20 | [1] 168.5 | 7.2 |

[1] No sign of incipient gelation.

The results tabulated above clearly demonstrate that the yield of soluble unsaturated copolymer prior to gelation increases with the amount of non-conjugated diene present in the reaction mixture. Since Example 1g shows that the diene alone possesses only a small tendency to homopolymerize, the increasing yields of copolymer correspond to conversions of increasing amounts of the acrylic ester to the copolymeric form. Example 1f shows that in the presence of sufficient quantities of the diene, the copolymerization can be carried to high yields of product without insolubilization.

EXAMPLE 2

A mixture of 21.5 parts of methyl acrylate, 156.0 parts of 2,5-dimethyl-1,5-hexadiene and 5.37 parts of a 60% solution of tertiary-butyl hydrogen peroxide is heated at reflux for 24 hours. The reaction is halted by cooling and after a trace of hydroquinone is added to inhibit further polymerization, the reaction mixture is distilled at 20° C. and 6 mm. pressure, thereby removing 114 parts of unreacted starting materials. The copolymer is isolated from the viscous distillation residue by the addition of n-hexane, and the precipitated product is further purified by repeated solution in acetone and precipitation with n-hexane. After drying to constant weight in vacuo, 23 parts of a white polymeric solid are obtained which is readily soluble in acetone, chloroform, benzene, toluene, xylene and allylic alcohols. The copolymer softens at approximately 45–50° C., melts at about 140° C., and polymerizes to an infusible mass when heated above 250° C.

Analysis: Found—C, 68.92%; H, 9.47%; Iodine (Wijs) Number, 66.9; Limiting viscosity $[\eta]_0$ in acetone, 0.088.

The analysis corresponds to a copolymer containing approximately 58.2% by weight of methyl acrylate and 41.8% of the diene. The iodine number indicates the amount of residual unsaturation in the copolymer which is available for further copolymerization with reactive ethylenic compounds.

Seven parts of the copolymer are dissolved in 3.0 parts of diethyl fumarate and heated in a mold with 0.5 part of benzoyl peroxide for 40 hours at 60° C. and then for two additional hours at 120° C. to yield a clear, flexible product which is insoluble in chloroform and in acetone.

EXAMPLE 3

A mixture of 51.7 parts of n-butyl acrylate, 375.3 parts of 2,5-dimethyl-1,5-hexadiene, and 9.0 parts of a 60% solution of tertiary-butyl hydrogen peroxide, is heated for 24 hours at reflux. After distillation of the reaction mixture to remove the major proportion of the unreacted starting materials, the copolymer is precipitated from the viscous residue by the addition of a mixture of 80% by weight of methanol and 20% of water. Further purification is effected by repeated solution in acetone and precipitation with the methanol-water mixture, and drying in vacuo; 78.1 parts of a clear plastic mass are obtained.

Analysis: Found—C, 73.67%; H, 10.66%; Iodine Number 79.4; $[\eta]_0$, 0.073.

The analysis corresponds to a copolymer containing approximately 62.6% by weight of n-butyl acrylate and 37.4% of the diene.

EXAMPLE 4

A mixture of 25.8 parts of isobutyl acrylate, 187.7 parts of 2,5-dimethyl-1,5-hexadiene and 4.48 parts of a 60% tertiary-butyl hydrogen peroxide solution is heated at reflux for 24 hours. The resulting copolymer is isolated and purified in the manner of Example 3 above to yield 44.5 parts of a clear, plastic mass.

Analysis: Found—C, 74.84%; H, 11.02%; Iodine number 87.5; $[\eta]_0$, 0.062.

The analysis corresponds to a copolymer containing approximately 57.3% by weight of isobutyl acrylate and 42.7% of the diene.

Eight parts of the copolymer of Example 4 are dissolved in 2.0 parts of methyl acrylate and heated in a mold with 0.2 part of benzoyl peroxide for 15.2 hours at 60° C., and for 2 additional hours at 120° C. to yield a clear, colorless, tough product which is insoluble in acetone.

Similarly, a solution of 7.0 parts of the copolymer in 3.0 parts of methyl acrylate is admixed with 0.4 part of benzoyl peroxide and heated for 15.5 hours at 60° C., and then for 2 hours at 120° C. The resulting product is tough, somewhat flexible, and insoluble in acetone.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. An acetone-soluble unsaturated copolymerizate of 2,5-dimethyl-1,5-hexadiene and an acrylic ester of the formula

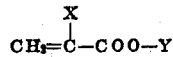

where X is a radical selected from the group consisting of hydrogen and alkyl, and Y is a radical selected from the group consisting of alkyl, aryl and aralkyl in which formation of copolymerizate each monomer has participated in more than negligible degree from an original reaction mixture in which the molar ratio of the diene to the acrylic ester is from 1:1 to 6:1.

2. An acetone-soluble unsaturated copolymerizate of 2,5-dimethyl-1,5-hexadiene and methyl acrylate in which formation of copolymerizate each monomer has participated in more than negligible degree from an original reaction mixture in which the molar ratio of the diene to the acrylic ester is from 1:1 to 6:1.

3. An acetone-soluble unsaturated copolymerizate of 2,5-dimethyl-1,5-hexadiene and n-butyl acrylate in which formation of copolymerizate each monomer has participated in more than negligible degree from an original reaction mixture in which the molar ratio of the diene to the acrylic ester is from 1:1 to 6:1.

4. An acetone-soluble unsaturated copolymerizate of 2,5-dimethyl-1,5-hexadiene and isobutyl acrylate in which formation of copolymerizate each monomer has participated in more than negligible degree from an original reaction mixture in which the molar ratio of the diene to the acrylic ester is from 1:1 to 6:1.

5. A method which comprises heating together 2,5-dimethyl-1,5-hexadiene and a monomeric acrylic ester of the formula

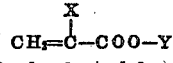

where X is a radical selected from the group consisting of H and alkyl, and Y is a radical selected from the group consisting of alkyl, aryl and aralkyl, in the presence of a per-oxy compound catalyst, the molar ratio of the diene to the acrylic ester being from 1:1 to 6:1, and stopping the reaction before the mixture gels whereby to produce a high yield of an acetone-soluble interpolymerizate of said monomers.

6. A method which comprises heating together 2,5-dimethyl-1,5-hexadiene and a monomeric acrylic ester of the formula

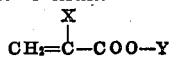

where X is a radical selected from the group consisting of H and alkyl, and Y is a radical selected from the group consisting of alkyl, aryl and aralkyl, in the presence of a per-oxy compound catalyst, the molar ratio of the diene to the acrylic ester being at least 6:1, whereby to produce an acetone-soluble interpolymerizate of said monomers.

PLINY O. TAWNEY.

REFERENCES CITED

The following references are of record in the file of this patent:

UNITED STATES PATENTS

| Number | Name | Date |
|---|---|---|
| 2,202,846 | Garvey et al. | June 4, 1940 |

OTHER REFERENCES

Norrish et al., Proceedings Royal Society London (1937), A-163, pp. 205–220.